(12) United States Patent
Fischer

(45) Date of Patent: Aug. 17, 2004
(10) Patent No.: US 6,777,930 B2

(54) SEQUENTIALLY NON-DESTRUCTIVE THICKNESS MEASUREMENT

(75) Inventor: Helmut Fischer, Sindelfingen (DE)

(73) Assignee: Helmut Fischer GmbH & Co., Sindelfingen (DE)

(*) Notice: Subject to any disclaimer, the term of this patent is extended or adjusted under 35 U.S.C. 154(b) by 76 days.

(21) Appl. No.: 09/818,036

(22) Filed: Mar. 26, 2001

(65) Prior Publication Data

US 2002/0021125 A1 Feb. 21, 2002

(30) Foreign Application Priority Data

Mar. 24, 2000 (DE) .......................................... 100 14 348

(51) Int. Cl.[7] .................................................. G01B 7/06
(52) U.S. Cl. ........................ 324/230; 324/238; 324/240; 324/229
(58) Field of Search ................................ 324/229, 230, 324/231, 234–243, 262

(56) References Cited

U.S. PATENT DOCUMENTS

| 2,116,119 A | * | 5/1938 | Lowenstein | 324/229 |
| 5,191,286 A | * | 3/1993 | Fischer | 324/230 |
| 5,194,805 A | * | 3/1993 | Nakajima et al. | 324/207.16 |

* cited by examiner

*Primary Examiner*—Jay Patidar (57) ABSTRACT

A method for the nondestructive measurement of the thickness of thin layers having a probe, having a first coil device on an inner core, the geometrical center of which coil device and the geometrical center of at least one second coil device coincide, the at least one second coil device partially surrounding the first coil device, and an evaluation unit, to which signals of the coil devices are emitted during a measurement for ascertaining the layer thickness. A circuit is provided, by which the first and the at least one second coil devices are excited sequentially during a measurement.

23 Claims, 6 Drawing Sheets

SEQUENTIALLY NON-DESTRUCTIVE THICKNESS MEASUREMENT

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

TECHNICAL FIELD

The invention relates to a method for the nondestructive measurement of the thickness of thin layers with a probe for nondestructive measurement of the thickness of thin layers and to an apparatus for carrying out the method according to the invention.

Curved and coated surfaces can be encountered in particular in aircraft construction, in automobiles, in moulded parts, in the area of household articles, in pipeline construction, on Venetian blinds and in the case of many other coated objects of measurement. In the area of nuclear power as well, oxide layers on zirconium heat exchanger tubes, in the range of 20 μm on tubes approximately 12 mm in diameter, are to be measured.

Known tactile measuring methods, which are based for example on the eddy current principle, are influenced very strongly by the shape of the object of measurement. For this reason, when there are different curvatures a calibration must take place, which is time-consuming and may lead to errors, in particular because changes in curvature are not taken into account.

German Patent Document DE 41 19 903 A1 discloses a method and an apparatus for the measurement of thin layers, making it possible that the undesired dependence of the measured value on the geometrical shape of the object of measurement can be eliminated in a broad range. This means that it is made possible for thin layers to be measured even on curved surfaces of objects of measurement. These are layer thicknesses from just a few μm to several 100 mm. This nondestructive layer thickness measurement relies on the eddy current principle, which is based on changes of a low frequency or high-frequency electromagnetic field in dependence on a layer applied to the object of measurement. Provided for this is an apparatus which has a first coil device on a ferrite core. An outer sleeve, which surrounds the first coil device, receives a second coil device, lying outside. The core receiving the first coil device has at its lower end a hemispherical placement dome of abrasion-resistant material.

To ascertain the layer, the probe is placed on the object of measurement. The two coil devices are excited with frequencies which are different at the same time and consequently emit two signals of different frequencies during the measurement, which are evaluated by a suitable circuit in order to calculate the layer thickness. The layer thickness is ascertained in accordance with the equations specified in DE 41 19 903 A1.

SUMMARY OF THE INVENTION

The invention is thus based on the object of improving the quality of the ascertained layer thickness values in the nondestructive measurement of the thickness of thin layers.

This object is achieved by the steps of using a probe having a first coil device on an inner core, the geometrical center of which coil device and the geometrical of at least a second coil device coincide, the at least second coil device partially surrounding the first coil device, using an evaluation unit, to which signals of the coil devices are emitted during a measurement for ascertaining the layer thickness, using a circuit, by which the first and the at least second coil device are excited sequentially during a measurement. The sequential excitation of at least two coil devices allows nondestructive emission of the measuring signals to take place from the coil devices to an evaluation unit. The successive excitation of the coil devices with the respective frequency allows a signal uninfluenced by the respectively neighbouring other coil device to be recorded by the evaluation unit during the measurement and also unequivocally assigned to each coil device. As a result, overshooting or sympathetic excitation of the neighbouring coil device can be eliminated, whereby the signal emission can take place free from disturbing parameters.

According to a further refinement of the method, it is provided that the coils are excited with high frequency. As a result, changes of the alternating electromagnetic field when a probe head approaches the object of measurement can be utilised as a measuring effect for the measurement. When high-frequency fields are used, the layers to be measured are electrically non-conducting, such as paint for example, or weakly conducting, such as chromium or the like for example.

According to a further refinement of the method, it is provided that the frequency signals coming from the first and at least second coil device, which are emitted at separate times from one another, are restricted in the duration of the emission of the signals by field-effect transistors. As a result, a separation between the emitted frequency signal of the first coil device and of the at least second coil device can be ensured, whereby an exact recording and assignment of the measuring signals can be achieved. As a result, mutual influencing or superimposing can be prevented, even during the transmission of the signals to the evaluation unit. The activation of the coil devices and of the field-effect transistors, via which the measuring signals are passed on to an evaluation unit, can take place in a defined time window, whereby the assigning of the measuring signals is also made possible.

According to a further refinement of the method, it is provided that the signals emitted by the coil devices are evaluated independently of one another. For example, a signal substantially determining the layer thickness may be recorded by a first coil device, while for example a signal determining the curvature of the object of measurement may be recorded through the other coil device. The separate evaluation allows an exact calculation of the two measurement variables to be obtained, whereby the subsequent ascertainment of the measured value can take place by the formulae—as revealed by DE 41 19 903 A1—with a higher degree of accuracy.

The separation of the signals of the coil devices advantageously allows the excitation of the coil devices to take place with the same frequency, whereby further simplification of the structural set-up of the control system can be achieved.

According to a further refinement of the method, it is provided that, for carrying out a measurement, a first coil device is excited by a first circuit and a second coil device is excited in a second circuit one after the other by means of a flip-flop circuit. The provided field-effect transistors make it possible to ensure by the circuitry used that the sequential activation of the coil device is made possible for the emission of frequency signals. It is provided that the circuits of the coil devices are identically designed. As a result, the set-up of the circuit can be of a simple arrangement.

According to a further refinement of the method, it is provided that the frequency signals are passed to the evaluation unit via a compensator. This makes it possible for the phase relationship of the frequency signals to be set in such a way that the undesired dependence of the measuring signals on the electrical conductivity of the base material is largely eliminated.

Consequently, the method according to the invention for the nondestructive measurement of the thickness of thin layers allows the effect to be achieved that the influence on the measured values at least of disturbing parameters such as the curvature of the surfaces and the conductivity of the object of measurement, which have particularly critical effects in the measurement of thin layers in the range of just a few $\mu$m, is eliminated virtually completely.

The apparatus according to the invention, which is intended in particular for carrying out the method, has in a housing a ferritic cup-type core, which receives a first coil device and has on a pin lying in the first coil device a hemispherical placement dome and receives a further coil device, outside the cup-shaped core, concentrically with respect to the first coil device. The coil devices, which are arranged fixedly in relation to each other and have a common centre axis, allow an exact ascertainment to be obtained, since the range of action of the first and second coil devices emanates from the common geometrical axis on account of the common placement point of the hemispherical placement dome. The first or inner coil device is in this case designed to be sensitive to layer thicknesses and the outer or second coil device is designed to be sensitive to curvature.

BRIEF DESCRIPTION OF THE DRAWINGS

An embodiment of the measuring probe and of a circuit for carrying out the method according to the invention are explained in more detail in the following description. In the figures.

DETAILED DESCRIPTION OF THE EMBODIMENTS

Figure 1:
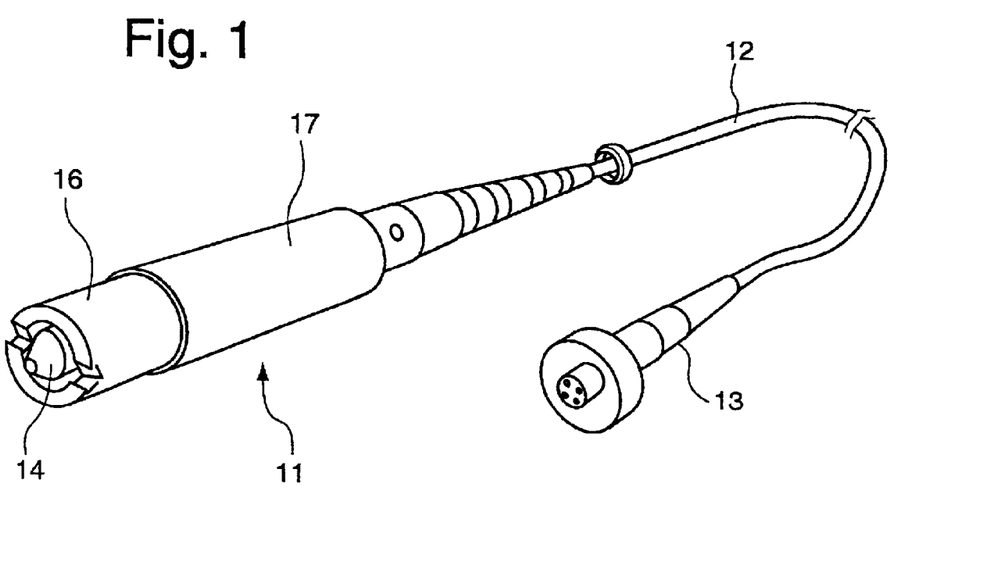
FIG. 1 shows a perspective view of a measuring probe.

A device designed as a measuring probe 11 is represented perspectively in FIG. 1. The measuring probe 11 can be connected via a cable 12 and a connection plug 13 to an evaluation device (not represented in any more detail). The measuring probe 11 has a probe head 14, which is surrounded by a sleeve 16. The probe head 14 is arranged axially movably with respect to the guide sleeve 17. This is described in more detail below in FIG. 4.

Figure 2:
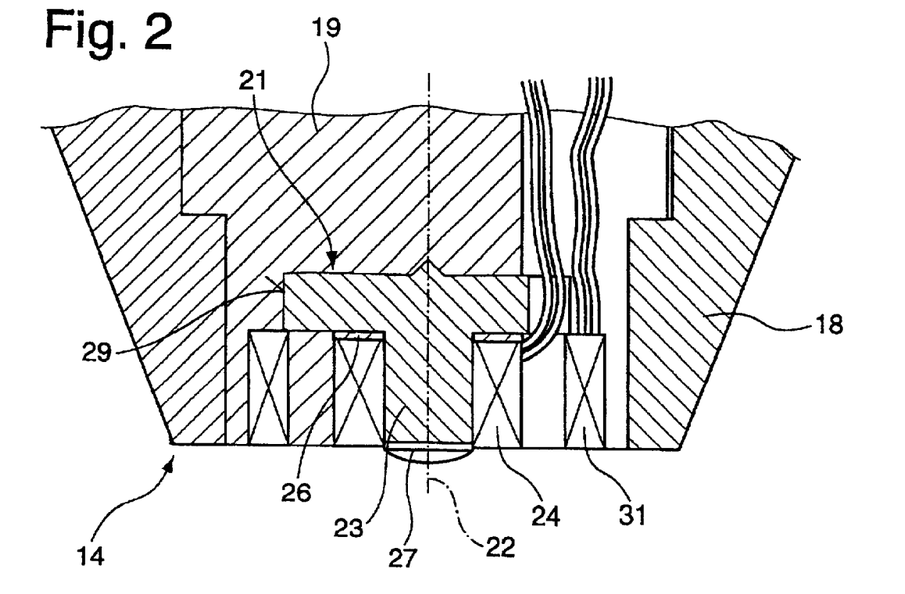
FIG. 2 shows a schematic cross section of a probe head of the measuring probe.
Figure 2A:
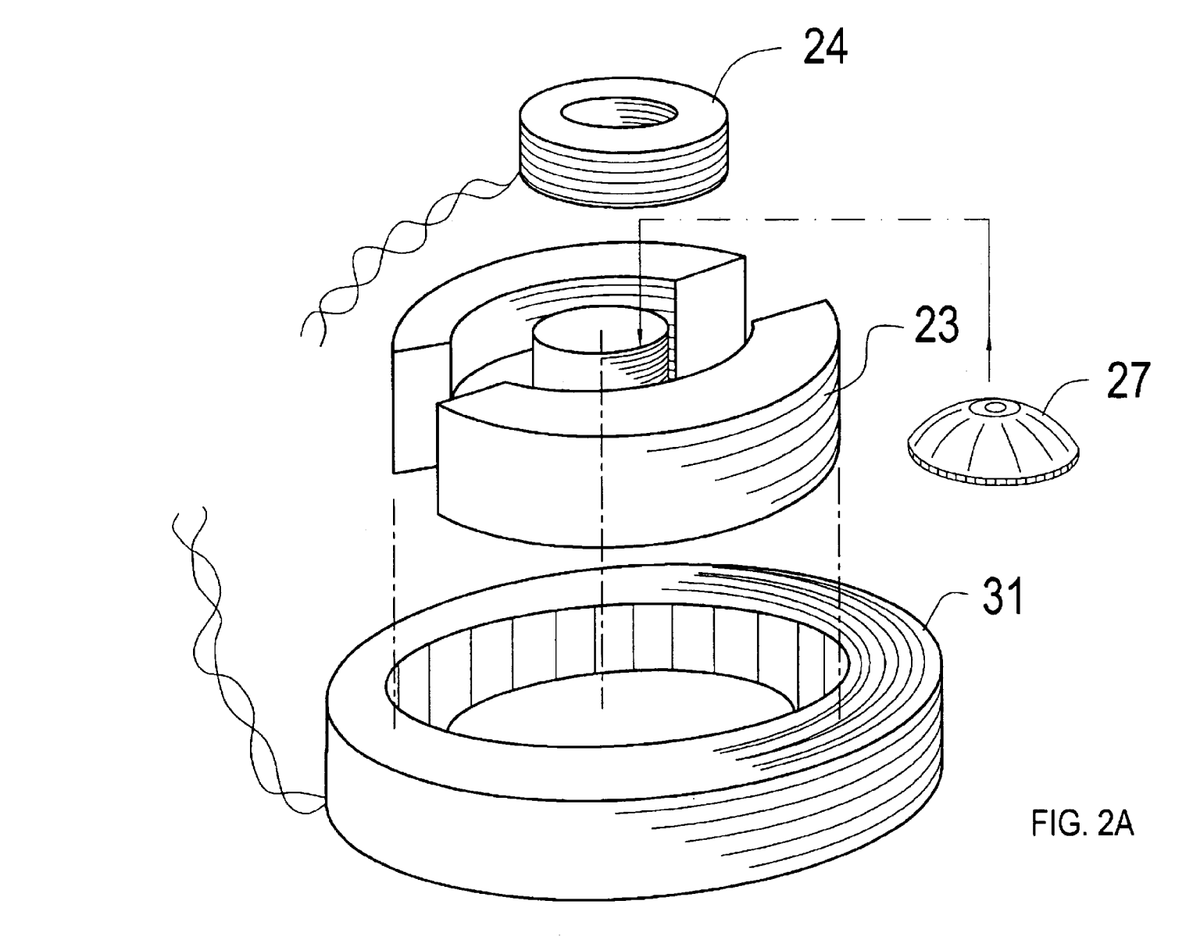
Figure 3:
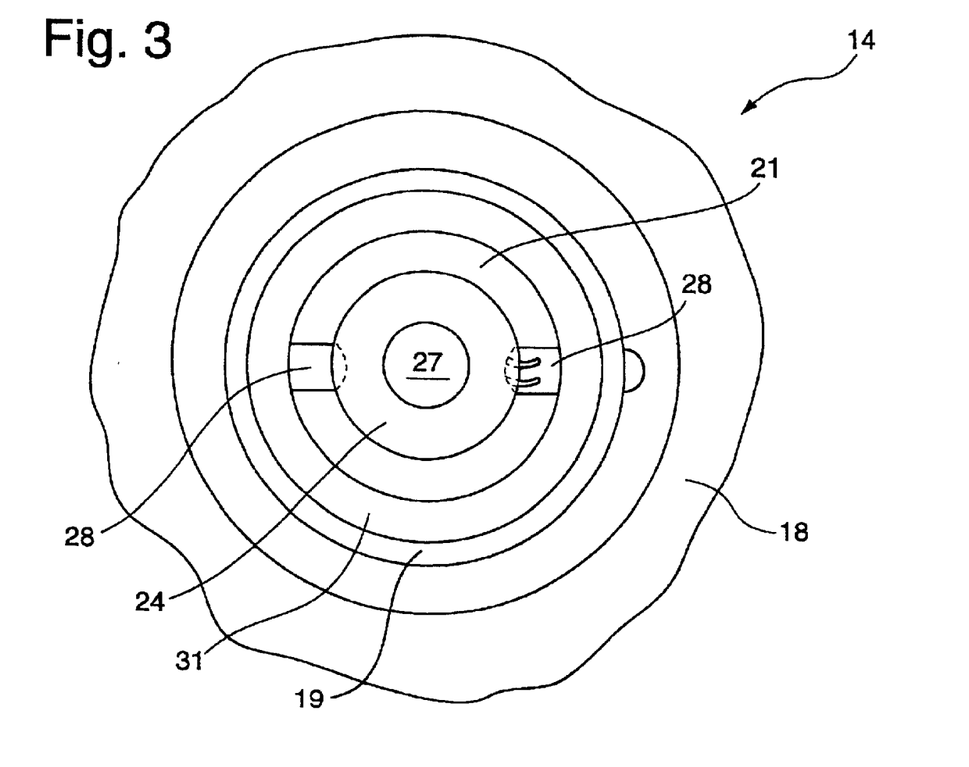
FIG. 3 shows a view from below of the measuring head according to FIG. 2.

A schematic cross section of the probe head 14 is represented greatly enlarged in FIG. 2. The corresponding view from below is represented in FIG. 3. The probe head 14 has a housing 18, in which a measuring system is embedded in a preferably non-magnetic composition 19. The measuring system comprises a cup-type core 21, which has central pin 23 in a geometrical axis 22. A first or inner coil device 24 is provided concentrically with respect to the central pin 23. Provided on the end face of the cup-type core 21 is, for example, an insulating disc 26. The cup-type core 21 has on the end face of the central pin 23 a hemispherical placement dome 27, which is formed from abrasion-resistant material, such as for example a ruby, and at least a nonmagnetic material. The placement surface of the hemispherical placement dome 27 is of a curved design, the deepest point of which lies in the geometrical axis 22. The cup-like core 21 has preferably diametrically opposing slits 28, through which connection lines of the inner coil device 24 are led into a rear region of the probe head 14, which in turn is connected to an electronic circuit 50. Arranged on an outer shell 29 of the cup-type core 21 is a second or outer coil device 31. The coil devices 24, 31 are immovable on the cup-type core 21, for example cast firmly in place, so that the probe head 14 is designed as a solid unit. The end faces of the coil devices 24, 31 pointing towards the object of measurement are arranged on a common plane. Similarly, the end face of the housing 18 advantageously lies in this plane. The measuring probe 11 has dimensionally, for example, a typical diameter of a fountain pen, in which the actual measuring system with a diameter of approximately 2 mm is movably fitted.

The layer thicknesses of interest mainly lie in the range of several $\mu$m to 100 $\mu$m. However, thicker coatings which reach into the mm range can also be recorded.

Figure 4:
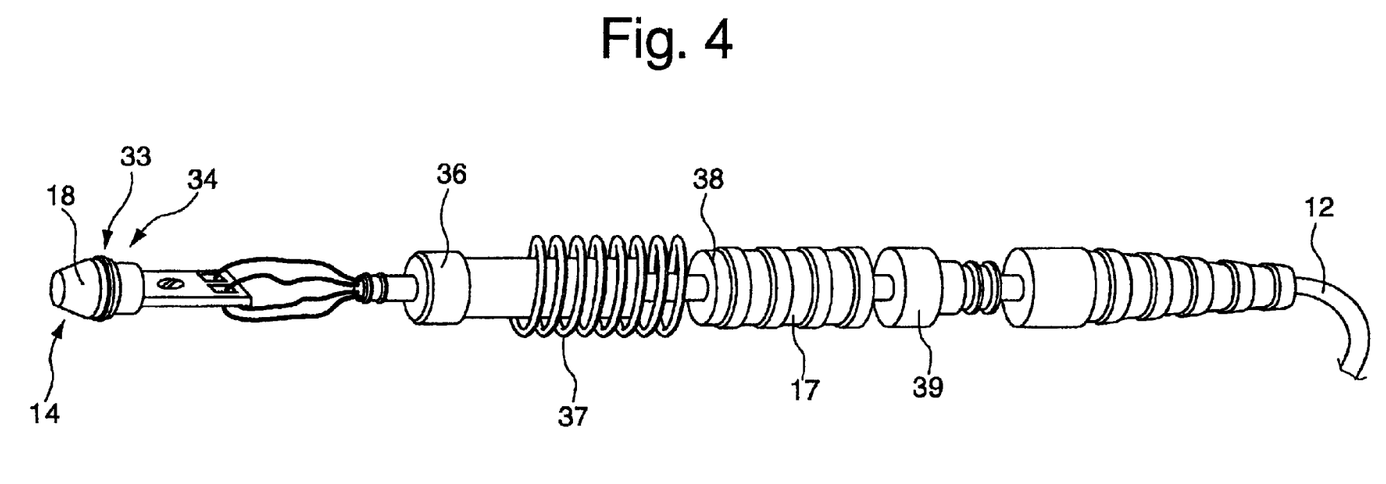
FIG. 4 shows a schematic representation of components of the measuring probe which can be fitted one inside the other.

A set-up of the measuring probe 11 is represented in FIG. 4 in a kind of exploded representation. The probe head 14 has a first cylindrical portion 33, which merges with a second portion 34 of a smaller diameter. The cylindrical portion 34 advantageously has a thread, so that an easy way of fitting it with respect to the intermediate sleeve 36 is obtained. In this portion is a printed-circuit board, on which the circuit 50 according to the invention, represented in FIG. 6, is provided. This structural unit is received by an intermediate sleeve 36, which for its part is received by a guide sleeve 17 in a resiliently compliant manner by means of a preferably helical spring 37. The guide sleeve 17 has a receiving portion 38, on which the sleeve 16 can be fitted. The resilient mounting of the intermediate sleeve 36 in the guide sleeve 17 allows the probe head 14, which in a starting position protrudes from the end face of the sleeve 16, to move into the sleeve. This also serves the purpose that the hemispherical placement dome 27 makes placement contact in extension of the geometrical axis 22, as is described below in FIG. 5.

The intermediate sleeve 36 is guided axially movably in the guide sleeve 17. Furthermore, an anti-twisting means is provided, such as for example a tongue-and-groove connection or a spring element, which is arranged and braced against the intermediate sleeve and which runs in a groove of the guide sleeve. The connection lines to the guide sleeve 17 are fixed by means of an intermediate piece 39. At the same time, this may form a strain relief.

The spring 37, arranged between the intermediate sleeve 36 and the guide sleeve 17, is at least slightly biased, so that during the measurement of the curved surface the probe head 14 lies with an at least slight pressing force on the surface or the layer to be measured. However, this force is small in relation to the hardness of the layer, so that there are no impressions or damage after the measurement of the layer thickness.

Figure 5:
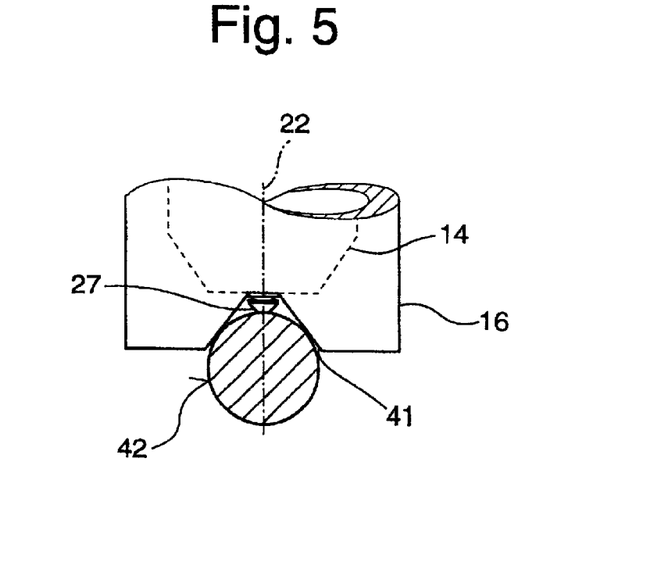
FIG. 5 shows a schematic representation of the measuring probe in measurement on a curved surface.
Figure 6:
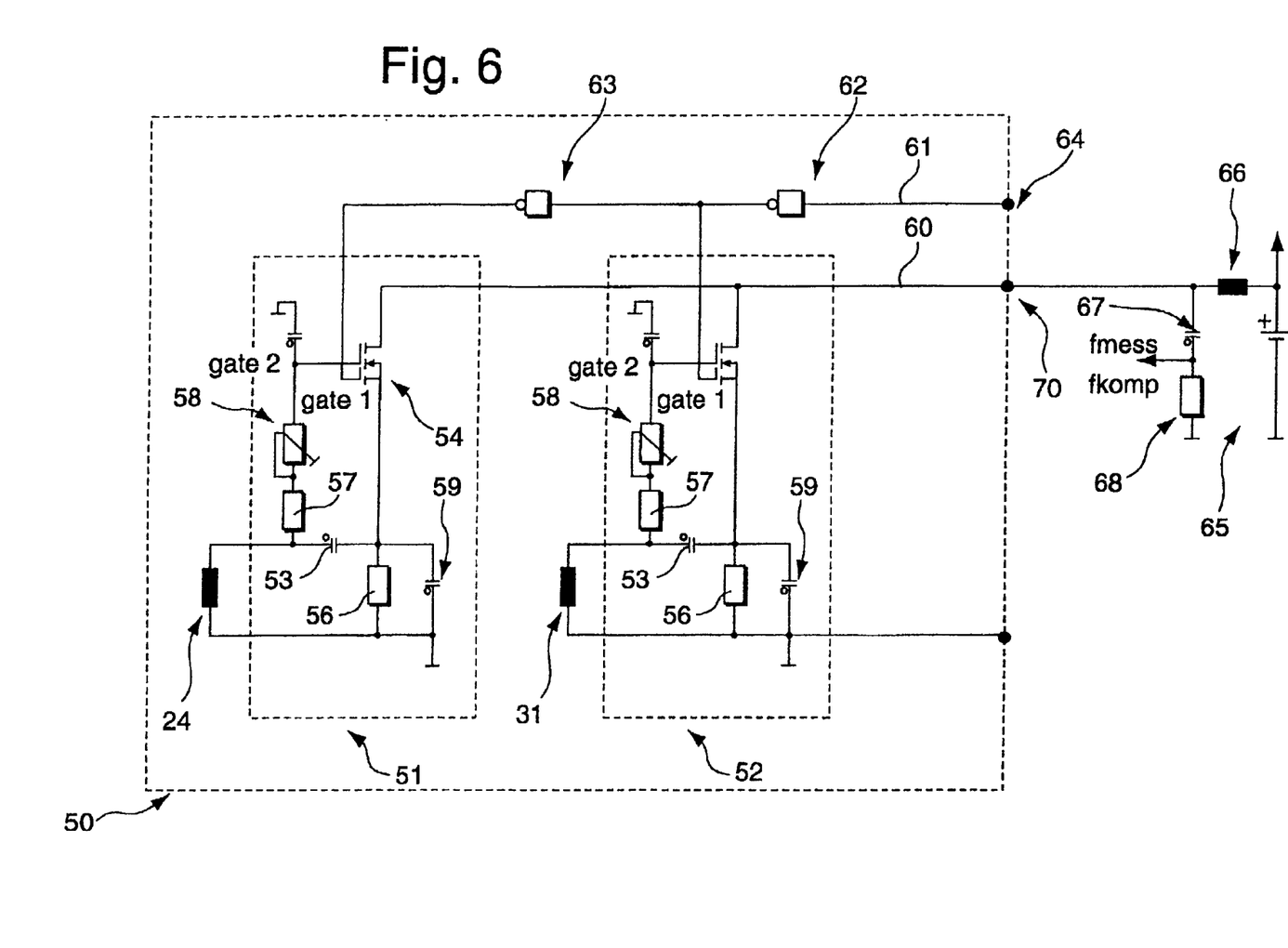
FIG. 6 shows a schematic representation of the circuit for carrying out the measuring method and FIG. 7 shows a diagram of a characteristic curve, which shows a comparison of measured values ascertained in a way according to the prior art and in a way according to the invention.

The measurement of a layer thickness on a curved surface is represented by way of example in FIG. 5. The sleeve 16 has on its end face a preferably prismatic recess 41, allowing the effect to be achieved that, when the measuring probe 11 is placed onto the curved surface, a secured and defined contact of the measuring probe 11 can be created with respect to the surface. The size and nature of the recess 41 can be adapted to different objects of measurement. This also allows the measuring probe 11 to be centred on the cylindrical or curved surface, whereby a controlled measurement can be carried out. The probe head 14 is in this case retracted into the sleeve 16 from its starting position, as represented for example in FIG. 1, along the geometrical axis 22. The hemispherical placement dome 27 is held at least under a slight pressure on the surface 42 of the object of measurement by the helical spring 37. Immediately after the measuring probe 11 has been placed on the object of measurement, measurement of the thickness of thin layers can be carried out.

Such a measurement is described below on the basis of the circuit 50 according to FIG. 6.

The circuit 50 comprises two virtually identical oscillating circuits 51 and 52. The mode of operation is described by way of example with reference to circuit 51, which is assigned to the inner winding or the coil device 24. The series oscillating circuit, comprising a capacitor 53 of this coil device 24, forms in connection with a dual-gate field-effect transistor 54 an active series resonance circuit. This is possible because, in the case of series resonance, a distinct overvoltage occurs at the coil device 24 in comparison with the high-frequency voltage which is produced at a resistor 56. This satisfies the resonance condition. The coil device 24 is at an earth potential on one side. The voltage produced at the coil device 24 is fed via a resistor 57 and a variable resistor 58 to the gate 2 of the transistor 54. The variable resistor 58 can be used in connection with the capacitor to perform a phase rotation in such a way that the undesired dependence of the measured value on the conductivity of the base material is suppressed almost completely. A capacitor 59 determines the feedback and is chosen in such a way that a virtually sinusoidal voltage with a very small harmonic content is produced at the resistor 56. This makes it possible for spurious radiation to be largely suppressed. If the gate 1 of the transistor 54 is switched to low, the resonance condition is no longer satisfied and the oscillation decays very quickly. If the probe head 14 is brought towards a metallic base metal, eddy currents are generated in it, detuning the oscillating circuit 51. The approaching of the coil device 24 corresponds to the measuring effect of the layer thickness. The measuring effect is linked to the layer thickness by a non-linear function. The layer is generally electrically insulating, so that eddy currents are generated only in the base material. However, with the circuit 50, a measurement is also possible according to the invention when a poorly conducting, non-magnetic layer, for example chromium, is electrolytically deposited on non-magnetic base material, for example aluminium, which has a distinctly better conductivity.

The circuit 52 operates in a way analogous to the circuit 51. However, the coil device 31, which is preferably excited with the same frequency as the coil device 24, reacts substantially only to curvature, the curvature-induced changing frequency serving to compensate the influence of the curvature in a way corresponding to DE 41 19 903 A1. The excitation frequencies of the coil devices 24, 31 lie for example in the range from 5 to 30 MHz. Provided in a signal input line 56 are two inverters 62, 63, which ensure that only one transistor 54 of a circuit 51, 52 is enabled for oscillation. If the switching point 64 is at high (1), only the circuit 51 is enabled for oscillation. If the switching point 64 is at low (0), only the circuit 52 is enabled. The two dual-gate field-effect transistors 54 are connected via a line 60 to an identical d.c. supply voltage of, for example, 5 V, which is fed via a small inductance 66, in order to activate the latter. Alternatively, it is possible to dispense with the gate 1 of the field-effect transistors 54 and for the transistors 54 to be alternately switched on and off by two intermittently switched lines. This type of switching is possible by means of high-speed semiconductor switches.

The resonance of the two sequentially connected transistors 54 has the effect that the respective resonant frequency can be picked up by the circuit 51 and 52 at the resistor 68 via the inductance 66, which forms a series oscillating circuit 65 with a capacitor 67. This allows signals of the respective coil device 24, 31 to be detected and picked up, recorded and evaluated by the downstream series circuit 65 via a switching point 70. The high-frequency signals are superimposed on the d.c. voltage supply line 61. For the evaluation, a change between the coil devices 24, 31 takes place for example 10 times every second, so that at least 100,000 oscillations are available for forming the measured value. A smaller number would also suffice.

In connection with the switching state at the switching point 64, the resonance is uniquely defined by the circuits 51 and 52, so that the two signals of the circuits 51, 52 can be brought together, as described in DE 41 19 903 A1, in a downstream circuit. The circuit shown may be constructed using SMD technology and be integrated directly in the probe 11, as shown in FIG. 4.

Figure 7:
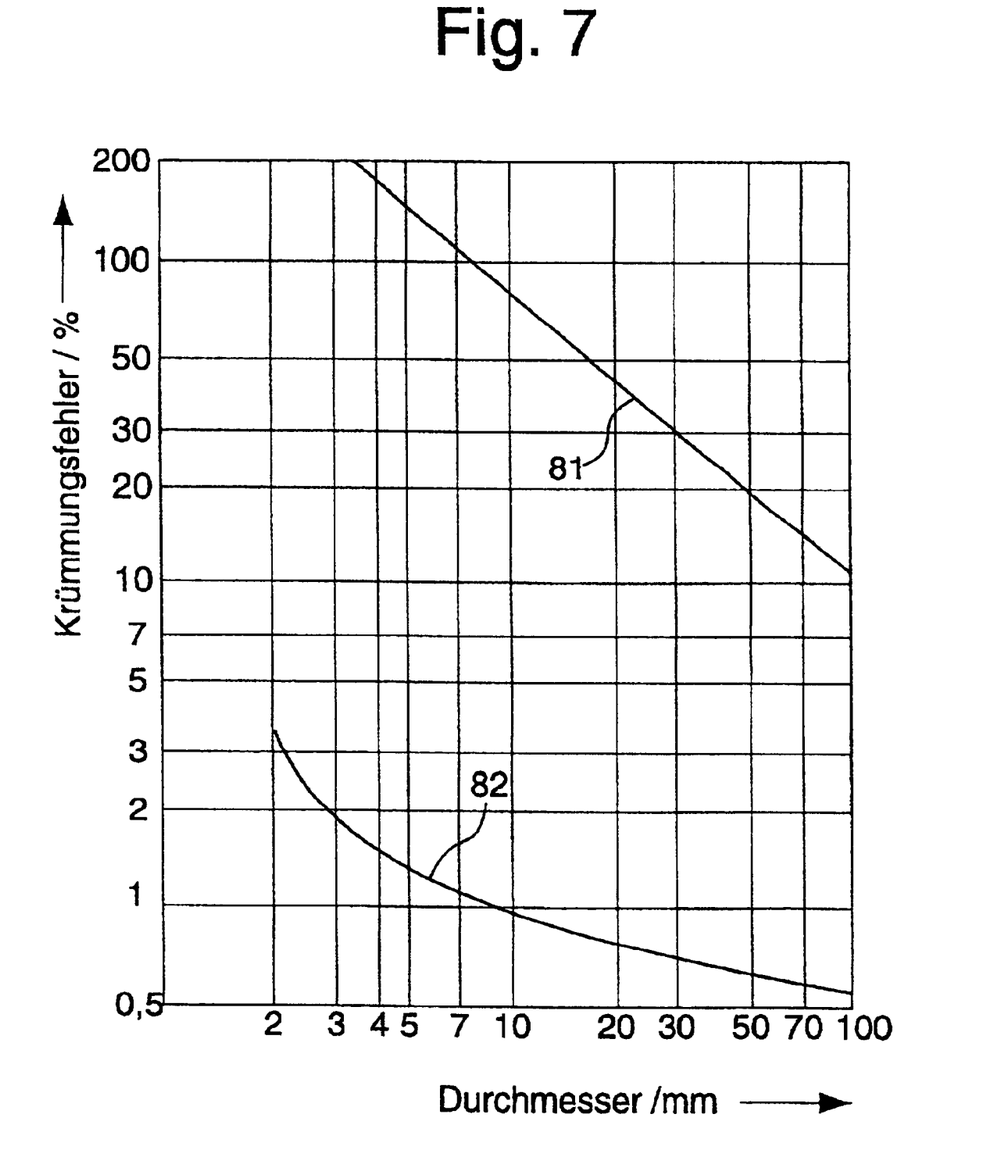

Represented in FIG. 7 is a diagram of a characteristic curve, which represents the percentage accounted for by the curvature in dependence on the diameter of the curved surface on which a measurement of the layer thickness has taken place. A characteristic curve 81 represents the measured values which have until now been ascertained by measuring probes and circuits known from the prior art. It can be seen from this that the curvature error previously made up a considerable percentage, particularly in the case of very small diameters. The apparatus according to the invention and the method according to the invention ascertain measured values according to a characteristic curve 82, the percentage curvature error of which is reduced to a considerable extent. This makes it clear to what extent an improvement over the prior art has been achieved. This is of great significance for the user. For example, it allows a substantial increase in measuring accuracy to be achieved in quality control.

I claim:

1. A method for the nondestructive measurement of the thickness of thin layers, comprising the steps of using a probe having a first coil device on an inner core, the geometrical center of which first coil device and the geometrical center of at least a second coil device coincide, the at least the at least second coil device partially surrounding the first coil device, using an evaluation unit, to which signals of the first and second coil devices are emitted during a measurement for ascertaining layer thickness, and using a circuit by which the first and the at least second coil devices are excited sequentially during a measurement.

2. The method according to claim 1, wherein the first and the at least second coil devices are excited with high frequency.

3. The method according to claim 1, further comprising limiting by transistors frequency signals coming from the first and the at least second coil devices that are emitted at separate times from one another, by the period for the emission of the frequency signals of each coil device.

4. The method according to claim 3, wherein the transistors are activated by a circuit in analogy with the first and the at least second coil devices.

5. The method according to claim 1, wherein signals emitted by the first and at least second coil devices are unequivocally assigned to a respective coil device and evaluated independently of one another by a series oscillating circuit.

6. The method according to claim 1, wherein the first and the at least second coil devices are excited with the same frequency.

7. The method according to claim 1, wherein the first coil device is excited with a frequency between 8 and 20 MHz, and the at least second coil device is excited with a frequency between 4 and 12 MHz.

8. The method according to claim 1, wherein oscillations of the first and the at least second coil devices of the measuring field that is changing during the measurement are interrogated at least twice per second.

9. The method according to claim 1, wherein the first coil device has a circuit and the at least second coil device has a circuit, which are connected parallel to each other, and a flip-flop circuit is provided, by which the transistor respectively assigned to the first and the at least coil devices is switched time-dependently.

10. The method according to claim 1, wherein frequency signals emitted by the first and the at least second coil devices are passed to the evaluation unit via a compensator.

11. An apparatus, comprising
a housing,
a first coil device
at least one second coil device
a hemispherical placement dome, and
a probe head with a ferritic cup-type core that receives the first coil device close to a common geometrical axis,
wherein the first coil device and the at least one second coil device are arranged fixedly in relation to each other, and
wherein the number of turns of the first coil device is equal to or less than that of the at least one second coil device,
the cup-type core having in a common geometrical axis a pin that lies within the first coil device and on the end face of which the hemispherical placement dome, which projects at least partially from an end face of the first coil device, is provided, the at least one second coil device is provided concentrically outside the cup-type core, and
the first coil device is designed such that it is sensitive to layer thicknesses and the at least one second coil device is designed such that it is sensitive to curvature.

12. The apparatus according to claim 11, wherein the first and the at least one second coil devices and are embedded in a casting composition.

13. The apparatus according to claim 11, wherein the first and the at least one second coil devices are arranged in one plane with respect to the end face of the probe head.

14. The apparatus according to claim 11, wherein the cup-type core has at least one lateral slit for leading through connection lines.

15. A circuit for separate evaluation of two measuring signals, for carrying out a method for the nondestructive measurement of the thickness of thin layers comprising the steps of using a probe having a first coil device on an inner core, the geometrical center of which coil device and the geometrical center of at least a second coil device coincide, the at least second coil device partially surrounding the first coil device, using an evaluation unit, to which signals of the first and the at least one second coil devices are emitted during a measurement for ascertaining the layer thickness, using a circuit by which the first and the at least one second coil devices are excited sequentially during a measurement, wherein detuning of a respective inductance results in a change in frequency, one inductance being influenced primarily by the layer thickness and the other inductance being influenced primarily by the curvature of the object of measurement.

16. The circuit according to claim 15, wherein the two inductances have a common earth and the frequency can be coupled out at a switching point in unequivocal assignment to the corresponding frequency signal.

17. An apparatus, comprising a housing,
a first coil device
a second coil device
a hemispherical placement dome,
a probe head with a ferritic cup-type core that receives the first coil device close to
a common geometrical axis,
wherein the first and the at least one second coil devices are arranged fixedly in relation to each other, and
wherein the number of turns of the first coil device is equal to or less than that of the second coil device.
the cup-type core having in the common geometrical axis a pin that lies within the first coil device and on the end face of which the hemispherical placement dome, which projects at least partially from the end face of the coil device, is provided, the at least one second coil device is provided concentrically outside the cup-type core,
the probe head is mounted such that it can be axially displaced in a guide sleeve and retracted with respect to a protective sleeve arranged fixedly in relation to the guide sleeve, and
the protective sleeve has a recess on an end face pointing towards the probe head.

18. The apparatus according to claim 17, wherein the first and the at least one second coil devices and are embedded in a casting composition.

19. The apparatus according to claim 17, wherein the first and the at least one second coil devices are arranged in one plane with respect to the end face of the probe head.

20. The apparatus according to claim 17, wherein the cup-type core has at least one lateral slit for leading through connection lines.

21. The apparatus according to claim 17, wherein the recess is prismatically formed.

22. The apparatus according to claim 17, wherein the probe head is retractable into the protective sleeve against a spring force, and a spring element is arranged with at least slight biasing with respect to the guide sleeve.

23. The apparatus according to claim 17, wherein the first coil device is designed such that it is sensitive to layer thicknesses and the at least one second coil device is designed such that it is sensitive to curvature.

* * * * *